United States Patent [19]

Yamasaki et al.

[11] Patent Number: 5,804,076

[45] Date of Patent: Sep. 8, 1998

[54] METHOD FOR TREATMENT OF WASTE WATER AND/OR EXHAUST GASES CONTAINING FLOURINE AND SURFACE ACTIVE AGENTS

[75] Inventors: Kazuyuki Yamasaki, Hiroshima; Masaki Kataoka, Fukuyama; Kazuyuki Sakata, Fukuyama; Shirou Imazu, Fukuyama, all of Japan

[73] Assignee: Sharp Kabushiki Kaisha, Osaka, Japan

[21] Appl. No.: 934,742

[22] Filed: Sep. 22, 1997

Related U.S. Application Data

[62] Division of Ser. No. 465,755, Jun. 6, 1995, Pat. No. 5,702,594.

[30] Foreign Application Priority Data

Aug. 26, 1994 [JP] Japan .................................. 6-201854

[51] Int. Cl.⁶ .................................. C02F 3/10; C02F 1/58
[52] U.S. Cl. .......................... 210/609; 210/617; 210/620; 210/624; 210/631
[58] Field of Search .................................. 210/150, 151, 210/192, 195.3, 197, 199, 202, 206, 220, 915, 615–617, 609, 610, 620, 621, 622, 631, 665–667, 694, 712, 721, 723, 726, 727, 765, 807, 623, 624, 626; 423/212, 213.2, 232, 240 S

[56] References Cited

U.S. PATENT DOCUMENTS

| | | |
|---|---|---|
| 2,458,163 | 1/1949 | Hays ........................................ 210/615 |
| 3,773,660 | 11/1973 | Hopwood .............................. 210/195.3 |
| 4,008,159 | 2/1977 | Besik ........................................ 210/151 |
| 4,224,148 | 9/1980 | Lindman et al. ....................... 210/726 |
| 4,469,599 | 9/1984 | Gros et al. .............................. 210/150 |
| 4,680,111 | 7/1987 | Veda ........................................ 210/615 |
| 4,717,519 | 1/1988 | Sagami ................................... 210/615 |
| 5,423,988 | 6/1995 | Yamasaki et al. ....................... 210/611 |
| 5,480,537 | 1/1996 | Yamasaki et al. ..................... 210/96.1 |
| 5,490,941 | 2/1996 | Miyabe et al. ....................... 423/240 S |
| 5,578,214 | 11/1996 | Yamasaki et al. ..................... 210/151 |
| 5,670,046 | 9/1997 | Kimmel ................................ 210/615 |
| 5,707,514 | 1/1998 | Yamasaki .............................. 210/617 |

Primary Examiner—Thomas G. Wyse
Attorney, Agent, or Firm—Nixon & Vanderhye, P.C.

[57] ABSTRACT

A first reaction/adjustment tank has a lower portion containing a calcium carbonate mineral, an upper portion containing a calcium carbonate mineral and a plastic filler, and an air lift pump for circulating waste water from the lower portion to the upper portion. Exhaust gas is introduced into a space. A second reaction/adjustment tank has a lower portion containing a calcium carbonate mineral and charcoal, and an upper portion containing charcoal and a plastic filler. Waste water circulates sequentially through the lower and upper portions of the first reaction/adjustment tank, and the lower and upper portions of the second reaction/adjustment tank. Exhaust gas circulates sequentially through the upper portion of the first reaction/adjustment tank and the upper portion of the second reaction/adjustment tank.

3 Claims, 8 Drawing Sheets

(INVENTION)

METHOD FOR TREATMENT OF WASTE WATER AND/OR EXHAUST GASES CONTAINING FLOURINE AND SURFACE ACTIVE AGENTS

This is a divisional of application Ser. No. 08/465,755, filed Jun. 6, 1995, now U.S. Pat. No. 5,702,594.

BACKGROUND OF THE INVENTION

1. Field of the Invention

The present invention relates to an apparatus and method for waste water treatment and, more particularly, to an apparatus and method for treating waste water containing fluorine and organic matter and, simultaneously therewith, treating exhaust gas containing fluorine and organic matter.

2. Description of the Prior Art

Hitherto, waste water containing fluorine and organic matter (hereinafter referred to as "waste water") and exhaust gas containing fluorine and organic matter (hereinafter referred to as "exhaust gas") discharged from various industrial facilities, semiconductor plants, etc., have been separately treated by employing a waste water treating apparatus and an exhaust gas treating apparatus respectively.

The fluorine in the waste water has been removed in such a way that slaked lime, among others, is added in a large amount to the waste water to produce a persistent calcium fluoride thereby to precipitate the fluorine. Any organic matter, such as surface active agent and organic solvent, in the waste water has been treated in such a manner that, after the fluorine is treated as described hereinabove, the organic matter is biologically treated, while a nutrient is being added, in a tank or the like separate from the one in which the fluorine is treated, or where the organic matter is of a low concentration, it has been treated through the process of activated carbon adsorption.

The fluorine in exhaust gases has been treated by an exhaust gas treating apparatus or typically an acid gas scrubber, and an organic matter in the exhaust gas, such as organic solvents, has been treated by an exhaust gas is treating apparatus packed with activated carbon (more specifically, an activated carbon adsorption apparatus). Typical examples of organic substances in the exhaust gas includes acetone, isopropylalcohol, and other organic solvents. Organic solvents are generally adsorption-treated by the activated carbon adsorption apparatus.

Generally, an activated carbon adsorption apparatus includes two or more activated carbon adsorption columns which are adapted to alternately repeat adsorption and desorption thereby to adsorptively treat organic solvents successively. However, the activated carbon adsorption apparatus will not decompose organic solvents; therefore, the total amount of the organic solvents per se will remain unchanged.

At existing semiconductor and liquid crystal plants, projects for redevelopment through equipment modernization have been undertaken so frequently that the initially planned capacity of the exhaust gas treating plant falls short of the capacity requirements. One reason for such shortage of treating capacity is that the production installations at present include a larger number of production units than initially planned. Another reason is that the introduction of new production units involves an increase in the volume of exhaust gas to be treated under the specifications of the production installations.

Whilst, the problem with conventional exhaust gas treating apparatuses is that once the apparatus is set in place, it is impracticable to increase the treating capacity of the apparatus by remodelling the same. In order to increase the exhaust gas treating capacity, therefore, it is necessary that a new exhaust gas treating apparatus be installed anew.

However, from the standpoints of initial cost and space requirement, it is impracticable to plan installing an exhaust gas treating apparatus anew. Thus, the shortage of exhaust gas treating capacity has prevented smooth re-equipment at semiconductor and liquid crystal plants.

In order to tide over severe competitions among industrial concerns, it is an absolute condition to positively introduce new production apparatuses developed by today's technological renovation from time to time. At any such plant as aforesaid, therefore, a need exists for preparations that enable the plant to easily strengthen its exhaust gas treating facility so as to conform to capacity of new production equipment.

Recent trend toward departure from the use of chlorofluorocarbons influences on the water treating installations. At semiconductor and liquid crystal plants in particular, various surface active agents and organic solvents, such as alcohol, or organic substances are often used in place of a cleaning-purpose chlorofluorocarbon so as to meet the needs of the times that call for no more chlorofluorocarbon.

In particular, a cleaning method which comprises the use of extrapure water and surface active agents in combination is expected to be a major promising cleaning method which is oriented toward complete departure from the use of chlorofluorocarbons, judging from good cleaning effect of the method and less possibility of components being damaged by the method.

However, practicing the cleaning method which comprises a combined use of extrapure water and surface active agents poses a problem that at aforesaid plants the treatment of fluorine will result in an extremely large output of solid waste. Another problem concerns the effect of surface active agents upon treated water. Surface active agents have involved difficulty in the treatment thereof especially because they have bactericidal effects upon microorganisms utilized in waste water treatment.

As such, there has so far been developed no waste water treating apparatus which involves less output of solid waste and provides good quality treated water, and which is rational and economical. Thus, a need exists for a waste water treating apparatus which can treat waste water containing fluorine and organic matter or surface active agents in a rational and economical way.

Next, a conventional method for waste water treatment is explained with reference to FIGS. 5 and 6.

In general, fluorine-containing waste water at a semiconductor plant naturally contains sulfuric acid as well. At semiconductor plants in particular, for the purpose of treating fluorine-containing waste water, the concentration of fluorine in the waste water is often in the range of 30 to 300 ppm. Hitherto, waste water of such fluorine concentration has been treated with respect to its fluorine content through the process of adding such chemicals as slaked lime, polyaluminum chloride, and a polymer coagulant to produce fine flocs of calcium fluoride and aluminum fluoride, then producing larger flocs with a coagulant, and subsequently precipitating the flocs for separation.

FIG. 5 schematically illustrates a conventional waste water treating apparatus of the two-stage coagulating sedimentation type.

As FIG. 5 shows, waste water is first caused to flow into a raw waste water tank 51 in which some adjustment is made with the waste water in quantity and quality. Then, the waste water is transferred to a first reaction tank 52 by a waste water pump 62.

Then, the waste water is subjected to agitation reaction by an agitator 63 in the first reaction tank 52 to which has been added slaked lime. In the reaction tank 52, calcium fluoride is produced, whereby fluorine is removed from the waste water. Subsequently, the waste water is transferred to a second reaction tank 53 in which the waste water is subjected to agitation reaction. In the second reaction tank 53, unreacted fluorine in the waste water reacts with an aluminum agent to produce aluminum fluoride. Thus, a further amount of fluorine is removed from the waste water.

Next, the waste water is transferred to a first coagulating tank 54 in which a polymer coagulant is added. As a result, fine flocs of calcium fluoride formed by the reaction in the first reaction tank 52 and fine flocs of aluminum fluoride formed in the second reaction tank 53 are coagulated into larger flocs. Then, the waste water is subjected to solid-liquid separation in a first settling tank 55. In this connection, it is to be noted that a larger proportion of the slurry, including flocs, subjected to solid-liquid separation in the first settling tank 55 is a hydroxide resulting from excess slaked lime, while the proportion of reaction products, such as calcium fluoride and aluminum fluoride, contained in the slurry is relatively small.

With the foregoing steps alone, it is impracticable to achieve a fluorine concentration of 15 ppm or less which is a target water quality. Subsequently, therefore, the waste water is transferred to a third reaction tank 56, a second coagulating tank 57, and a second settling tank 58 in sequence, and thereafter the waste water is passed through a pH adjusting tank 59 so that the pH of the waste water will come within the range of the effluent standards. The waste water thus treated is then discharged.

Meanwhile, the slurry collected from the first settling tank 55 and second settling tank 58 is concentrated in a sludge concentration tank 60, and the concentrated slurry is dehydrated by a filter press 61 into a cake having a prescribed water content.

Referring next to FIG. 6, there is shown a waste water treating apparatus equipped with a biological treating unit for waste water containing fluorine and surface active agents. This waste water treating apparatus, as FIG. 6 shows, is such that a contact oxidation tank 66 is disposed between the first settling tank 55 and the third reaction tank 56 in the waste water treating apparatus shown in FIG. 5. The contact oxidation tank 66 is packed with vinyl chloride-made and/or plastic-made corrugated filter media 67. The contact oxidation tank 66 is operative to oxidatively decompose organic substances, such as surface active agents, by the action of aerobic microorganisms present in the tank.

Next, a conventional exhaust gas treating apparatus is shown in FIG. 7. This exhaust gas treating apparatus 73 is such that circulating water, as pumped up from a lower portion by a circulating water pump 75, is sprayed over a plastic filler 72. For example, a scrubber by which conventional exhaust gas treating apparatus is represented is designed to physically treat exhaust gas to remove a target substance through the process of sprinkling water or an aqueous alkaline solution, as circulating water, over the plastic filler 72 thereby to enhance the contact between the gas (exhaust gas) and the liquid (circulating water). The term "target substance" refers specifically to fluorine in the exhaust gas, and the term "physically treat" means dissolving the fluorine gas in the aqueous alkaline solution. Therefore, aforesaid treatment involves no chemical reaction such that fluorine and calcium are caused to react with each other to produce calcium fluoride.

Treatment through activated carbon adsorption is generally known as a method for removing organic matter, such as surface active agents, from exhaust gas. This activated carbon treating method is solely based on the principle of physical adsorption. Therefore, when activated carbon adsorption reaches a saturation point, it is necessary to detach the adsorbed organic matter from the activated carbon and, in addition, it is necessary that the detached organic matter be treated in the waste water treating apparatus. In other words, the conventional exhaust gas treating apparatus is designed solely for adsorption treatment and has no function to biologically degrade organic matter by the action of organisms.

Recently, semiconductor and liquid crystal plants have been required to produce less waste in order to cope with increasingly demanding environmental audit conditions imposed on industrial concerns. Also, in view of today's severe industrial competition, these plants are required to direct their efforts toward initial cost reduction with respect to treating apparatuses. Further, such plants are confronted with problems of waste water treatment and exhaust gas treatment in particular which may have a large bearing upon environmental conditions.

Today, therefore, needs exist for improved waste water treating apparatus and improved exhaust gas treating apparatus which involve less solid waste generation and only require low initial cost.

Referring first to waste water, regulations on fluorine concentration in waste water have become more and more strict in recent years and, in many cases, industrial plants today are required to maintain a control fluorine level of one figure, i.e., several ppm under more stringent administrative standards. However, in order to keep the fluorine concentration in waste water at one-figure level, with a conventional system, e. g., two-stage sedimentation system, it has been impracticable to reduce fluorine concentration to the target concentration level unless aluminum agent is added more than 10 times the theoretical value relative to the fluorine concentration at the second stage of the system.

In the conventional method in which slaked lime and the like are added in treating fluorine (two-stage sedimentation system), the quantity of slaked lime required in relation to fluorine is more than three times the theoretical chemical reaction quantity (at first stage), because the pH of waste water is low on the order of 2–3 and the fluorine concentration always widely fluctuate within the range of 30–300 ppm. This involves large slurry generation (hydroxide, etc.). Further, slurry dehydration, when carried out by dehydrator, in effect, results in large volume output of solid waste in the form of dehydrated cake, because the water content of slurry is 65% or so. This involves an increase in the cost required for disposal of such dehydrated cake. Another problem involved is difficulty in securing potential disposal sites.

The reason why slaked lime is required more than three times the theoretical chemical reaction quantity is that the time for reaction between waste water and slaked lime added thereto must usually be set at not more than 30 minutes. In other words, without excess addition of slaked lime, fluorine removal cannot be sufficiently achieved within a predetermined time period, it being thus impossible to attain the target value for fluorine content (generally 20–30 ppm). If the reaction time could be set at more than 30 minutes to allow sufficient time for reaction, it would be possible to reduce the slaked lime requirements. In that case, however, more than three times the reaction tank capacity would be required and the agitator would be required to be of a larger size accordingly. This involves increased site area and increased construction cost.

Recently, there has been developed a method for treating fluorine-containing water utilizing a calcium carbonate mineral. In this method, the tank in which calcium carbonate mineral is packed is a closed tank; this necessitates frequent removal of reaction product from the closed tank after reaction. Such removal operation involves a large number of man-hours, which in reality poses a large problem in respect of maintenance.

In the recent situation that semiconductor devices go more and more microfine, semiconductor and liquid crystal plants are confronted with the difficulty that washing with extra-pure water does not permit sufficient cleaning with respect to microfine parts. Therefore, a cleaning method is now gaining popularity such that organic matter such as surface active agent or alcohol (for example, a chemical like a surfactant-containing buffered fluoric acid) is contained in extrapure water to give reduced surface tension in connection with cleaning operation. In this case, organic substances, such as surface active agents and alcohols, become contained in the fluorine-containing waste water. This makes it necessary to treat these organic substances simultaneously with fluorine removal.

However, during surfactant treatment, the molecular formula, structural formula, germicidal characteristic, and foaming property of the surface active agent make it extremely difficult to treat the surface active agent through utilization of microorganisms, even if nutrients, etc. are added which can provide favorable culture conditions for microorganisms.

SUMMARY OF THE INVENTION

Accordingly, the object of the present invention is to provide a rational and economical waste water treating apparatus and method which enables simultaneous treatment of waste water and exhaust gases that contain fluorine and surface active agents and which provides for reduction in the initial cost and running cost.

In order to achieve the aforementioned object, the present invention provides a waste water treating apparatus comprising:
- a lower portion having a calcium carbonate mineral packed therein so as to be submerged in waste water introduced in the lower portion, and aeration means for agitating the waste water through aeration;
- an upper portion located above the lower portion and at a level higher than the surface of the waste water introduced in the lower portion, the upper portion having a calcium carbonate mineral and a plastic filler which are so packed therein as to allow water penetration therethrough;
- waste water circulation means for pumping up waste water from the lower portion to the upper portion and spraying the pumped waste water over the upper portion; and
- exhaust gas introduction means for introducing exhaust gas into a space between the lower portion and the upper portion.

In the waste water treating apparatus of the present invention, waste water is agitated by air in the lower portion so that the waste water reacts with the calcium carbonate mineral to produce calcium fluoride. As a result, the fluorine concentration of the waste water is decreased. Thus, the waste water is made to contain crystalline calcium fluoride, that is, a crystal seed.

Microorganisms originating in the waste water propagate on the surface of the calcium carbonate mineral in the lower portion, so that surface active agents contained in the waste water are biologically treated by the microorganisms.

The waste water which contains aforesaid crystal seed is pumped up to the upper portion by the waste water circulating means and is sprayed over the upper portion. The waste water will gradually descend by gravity while having contact with the calcium carbonate and plastic filler in the upper portion.

The exhaust gas introducing means will introduce exhaust gas into the space between the upper and lower portions. The exhaust gas flows upward to the upper portion and comes into contact with the waste water which is moving downward in the upper portion so that fluorine is removed therefrom. Microorganisms propagated on the surface of the calcium carbonate mineral and plastic filler in the upper portion will act to biologically treat the surface active agents contained in the exhaust gas and also the surface active agents contained in the waste water.

Since the waste water contains crystalline calcium fluoride solid matter, the exhaust gas will be neutralized as it contacts and reacts with the waste water.

Therefore, according to the present invention, waste water is treated in the lower portion, and in the upper portion are treated both the waste water and the exhaust gas. Further, the exhaust gas can be treated by the waste water per se during the process of waste water treatment.

According to the present invention, therefore, a rational and economical waste water treating apparatus is provided which can simultaneously treat both waste water and exhaust gas that contain fluorine and surface active agents, and which provides for reduction in both initial cost and running cost.

The present invention also provides a waste water treating apparatus comprising:
- a first tank comprising:
  - a first lower portion having a calcium carbonate mineral packed therein so as to be submerged in waste water introduced in the first lower portion, and aeration means for agitating the waste water through aeration;
  - a first upper portion located above the first lower portion and at a level higher than the surface of the waste water introduced in the first lower portion, the first upper portion having a calcium carbonate mineral and a plastic filler which are so packed therein as to allow water penetration therethrough;
  - waste water circulation means for pumping up waste water from the first lower portion to the first upper portion and spraying the pumped waste water over the first upper portion; and
  - first exhaust gas introduction means for introducing exhaust gas into a first space between the first lower portion and the first upper portion;
- a second tank comprising:
  - a second lower portion having a calcium carbonate mineral and charcoal which are packed therein so as to be submerged in the waste water introduced from the first lower portion, and aeration means for agitating the waste water through aeration;
  - a second upper portion located above the second lower portion and at a level higher than the surface of the waste water introduced in the second lower portion, the second upper portion having charcoal and a plastic filler which are so packed therein as to allow water penetration therethrough;

waste water circulation means for pumping up waste water from the second lower portion to the second upper portion and spraying the pumped waste water over the second upper portion; and second exhaust gas introduction means for introducing exhaust gas from the first tank into a second space between the second lower portion and the second upper portion.

According to the present invention, it is arranged that waste water is caused to react with the calcium carbonate mineral in the first lower portion of the first tank to produce calcium fluoride so that the fluorine concentration of the waste water is reduced. Surface active agents contained in the waste water are biologically treated by microorganisms propagated on the surface of the calcium carbonate mineral. Then, the waste water, which now contains crystalline seeds of calcium fluoride, is pumped up to and sprayed over the first upper portion. The waste water so sprayed is biologically treated by microorganisms propagated on the surface of the calcium carbonate mineral and plastic filler in the first upper portion.

Meanwhile, the exhaust gas introduction means introduce exhaust gas into the first space between the first upper portion of the first lower portion. The exhaust gas flows up to the first upper portion and goes into contact with the waste water in the first upper portion for reaction therewith, so that the fluorine contained in the exhaust gas is removed. Surface active agents contained in the exhaust gas are biologically treated by microorganisms propagated on the surface of the calcium carbonate mineral and plastic filler in the first upper portion. The exhaust gas is neutralized through its reaction with the waste water.

Further, according the present invention, waste water is introduced from the first lower portion of the first tank into the second lower portion of the second tank. The waste water which has been introduced into the second lower portion goes in contact with the calcium carbonate mineral and with the charcoal which are packed in the second lower portion. Microorganisms originating in the waste water are thus allowed to propagate on the surface of the charcoal and calcium carbonate mineral, and the waste water is biologically treated by the microorganisms. Through this biological treatment, the concentration of organic matter in the waste water is reduced.

The second lower portion is under agitation by the aeration means and, therefore, microorganisms propagated on the surface of the calcium carbonate mineral and charcoal are separated from the surface after the lapse of a predetermined time period. Waste water that contains separated microorganisms is pumped up from the second lower portion into the second upper portion and is sprayed over the second upper portion. The waste water is then allowed to move downward by gravity while having contact with the charcoal and plastic filler packed in the second upper portion. At this point of time, aforesaid exhaust gas is introduced from the first tank into the space between the second lower portion and the second upper portion. Then, the exhaust gas enters the second upper portion, in which the exhaust gas reacts with the waste water while in contact therewith so that the organic matter in the exhaust gas is biologically treated. In this case, the organic matter (organic solvent) in the exhaust gas serves as a nutrient for microorganisms present in the waste water. Thus, the waste water is biologically treated by microorganisms propagated on the surface of the charcoal and plastic filler in the second upper portion, so that organic substances, such as surface active agents, are treated accordingly.

According to the present invention, fluorine and surface active agents contained in the waste water are treated in the first lower portion of the first tank, and again treated in the first upper portion. Further, the waste water is treated with respect to its fluorine and surface active agent contents in both the second lower and upper portions of the second tank. That is, waste water is treated in two steps in the first tank and, in addition, the waste water is treated in two steps in the second tank. This provides for exceptionally good treatment of fluorine and surface active agents contained in the waste water.

Further, in a combination of the first upper portion of the first tank and the second upper portion of the second tank, aforesaid exhaust gas can be treated in two steps by utilizing the waste water. Thus, the fluorine and surface active agents which are contained in the exhaust gas can be exceptionally well treated.

Therefore, according to the present invention, a rational and economical waste water treating apparatus is provided which can simultaneously treat waste water and exhaust gas that contain fluorine and surface active agents, to an exceptionally satisfactory degree.

In the waste water treating apparatus according to the present invention, where the waste water circulating means include an air lift pump, the air lift pump is operative to supply air to the waste water such that the air causes waste water to be lifted upward while destroying calcium fluoride crystal seeds contained in the waste water.

In an embodiment, the water treating apparatus further comprises a third tank for receiving waste water from the second tank, the third tank including agitation means for agitating the waste water introduced into the third tank and sludge fixing means for immobilizing sludge, the third tank being adapted to be loaded with an aluminum agent and a polymer coagulant;

a fourth tank which receives waste water from the third tank and in which the waste water is subjected to solid-liquid separation, a supernatant resulting from the separation being discharged from the fourth tank;

a fifth tank which receives a sludge formed by precipitation in the fourth tank and in which the sludge is concentrated by sedimentation;

dehydrator means which receives the sludge concentrated in the fifth tank for dehydrating the sludge; and sludge return means for returning the sludge formed in the fourth tank to at least one of the first upper portion of the first tank, the second upper portion of the second tank, and the sludge fixing means of the third tank.

In the embodiment waste water is introduced from the second tank into the third tank which is, in turn, loaded with an aluminum agent and a polymer coagulant. Then, the fluorine contained in the waste water reacts with the aluminum agent to produce aluminum fluoride. Any excess aluminum agent quickly changes into flocs of aluminum hydroxide, which in turn adsorb the aluminum fluoride. Flocs of aluminum hydroxide which have adsorbed the aluminum fluoride are adsorbed by the polymer coagulant into larger flocs.

The waste water containing the larger flocs is introduced into the fourth tank, in which the waste water is subjected to solid-liquid separation. Thus, a supernatant is discharged as a final treated water.

Any sludge resulting from the solid-liquid separation in the fourth tank is introduced into the fifth tank in which it is concentrated, and the concentrated sludge is dehydrated by the dehydrator means.

Therefore, according to this embodiment, the fluorine content of the waste water is separated from the waste water and finally it can be discharged in the form of dehydrated sludge.

Further, according to this embodiment, the sludge produced by solid-liquid separation in the fourth tank is returned to at least one of the first upper portion of the first tank, or the second upper portion of the second tank, or the sludge fixing means of the third tank. The sludge includes aforesaid flocs and further includes biological sludge that contains microorganisms. Therefore, at least one of the first upper portion, the second upper portion, and the sludge fixing means of the third tank, to which the sludge is supplied, facilitates gas-liquid contact thereby to provide increased exhaust gas treating efficiency and, in addition, enhances biological treatment of waste water and exhaust gases by aforesaid biological sludge. That is, according to this embodiment, the waste water and exhaust gas treating capability can be further enhanced.

Further, the present invention provides a waste water treating method which comprises:

introducing waste water into a lower portion to cause a calcium carbonate mineral packed in the lower portion to be submerged in the waste water, and agitating the waste water under aeration;

pumping up the waste water from the lower portion and spraying the waste water over an upper portion located above the lower portion which is filled with a calcium carbonate mineral and a plastic filler;

introducing exhaust gas into a space between the lower portion and the upper portion;

causing the waste water to pass by gravity through the calcium carbonate mineral and plastic filler;

causing the waste water to pass by gravity through the space in which the exhaust gas is present; and returning the waste water to the lower portion under the law of gravity.

Furthermore, the present invention provides a waste water treating method which comprises:

introducing waste water into a first lower portion of a first tank to cause a calcium carbonate mineral packed in the first lower portion to be submerged in the waste water, and agitating the waste water under aeration;

pumping up the waste water from the first lower portion and spraying the waste water over a first upper portion located above the first lower portion which is filled with a calcium carbonate mineral and a plastic filler;

introducing exhaust gas into a first space between the first lower portion and the first upper portion;

causing the waste water to pass by gravity through the calcium carbonate mineral and plastic filler in the first upper portion;

causing the waste water to pass by gravity through the first space in which the exhaust gas is present;

returning the waste water to the first lower portion under the law of gravity;

introducing waste water from the first lower portion of the first tank into a second lower portion of a second tank to cause a calcium carbonate mineral packed in the second lower portion to be submerged in the waste water, and agitating the waste water under aeration;

pumping up the waste water from the second lower portion and spraying the waste water over a second upper portion located above the second lower portion which is filled with charcoal and a plastic filler;

introducing exhaust gas from the first space into a second space between the second lower portion and the second upper portion;

causing the waste water to pass by gravity through the second space in which the exhaust gas is present; and returning the waste water to the second lower portion under the law of gravity.

In an embodiment, the water treating method further comprises introducing waste water from the second tank into a third tank, adding an aluminum agent and a polymer coagulant to the waste water in the third tank, agitating the waste water, and immobilizing sludge to sludge fixing means provided in the third tank;

introducing waste water from the third tank into a fourth tank, subjecting the waste water to solid-liquid separation, and discharging a separated supernatant from the fourth tank;

separating sludge from waste water by precipitation in the fourth tank, introducing the sludge into a fifth tank, and concentrating the sludge through sedimentation in the fifth tank;

returning the sludge separated in the fourth tank to at least one of the first upper portion of the first tank, the second upper portion of the second tank, and the sludge fixing means in the third tank; and dehydrating the sludge concentrated in the fifth tank by dehydrator means.

The characteristic features of the present invention are summarized in items (1) to (6) as follows.

(1) The waste water treating apparatus includes an exhaust gas treating unit disposed in an upper portion of the apparatus. An air lift pump provided in the apparatus supplies air to the exhaust gas treating unit so that crystal seeds therein are destroyed and the concentration of dissolved oxygen is increased, microbial propagation being thus facilitated. Through this arrangement, circulating water within the waste water treating apparatus is shared by the exhaust gas treating unit for utilization. The air lift pump is a most energy saving-oriented pump.

(2) In the first tank, with a calcium carbonate mineral packed therein for fluorine treatment, agitation is carried out while the quantity of air supply is varied, thereby destroying crystals (known as crystal seeds) formed on the surface of the calcium carbonate mineral. The waste water is treated while such process is in progress.

(3) In the second tank, charcoal and calcium carbonate mineral are packed in alternate layers to allow the propagation of various types of microorganisms thereon for the purpose of waste water treatment.

The waste water from which fluorine has been removed to a certain degree in the first tank is further subjected to a higher degree of treatment (treatment of fluorine, COD, BOD, etc.) through utilization of biological films formed by microorganisms. It is also possible to remove fluorine taking advantage of the principle that fluorine is concentrated into microbial bodies, with the microbial bodies being finally drawn out of the system.

Simultaneously with water treatment, a circulating water with microorganisms propagated therein is sprayed by means of the air lift pump over a water spray unit in an upper portion. More specifically, microorganisms are densely propagated on the charcoal and plastic filler packed in the water spray unit in the upper portion of the second tank, the plastic filler being of the type which is conventionally used in connection with exhaust gas treatment, and microbial layers (biological layers) thus formed on the charcoal and plastic filler are utilized to treat exhaust gases. That is, both waste water and exhaust gas can be effectively treated by utilizing microorganisms propagated on two kinds of fillers. Any organic matter (organic solvent) in the exhaust gas serves to be a nutrient for microorganisms. Hitherto, it has been difficult to microbially treat exhaust gases based on a mixture gas containing mineral acids (inorganic fluoric acid, sulfuric acid, etc,) and organic matter which originate in plant installations, because such gases are acidic. This difficulty can be overcome by the present invention. More particularly, according to the invention, any inorganic exhaust gas is chemicoreactionally treated with calcium carbonate mineral into a neutralized exhaust gas in the first tank, and the neutralized exhaust gas is in turn mixed with organic matter, being thus made into a neutral, organic matter-containing exhaust gas adapted for easy microbial treatment, which gas is further treated by a circulating water containing microorganisms separated from biological films formed on the filler material in the upper portion.

(4) Waste water and exhaust gas can be simultaneously treated in the first upper and first lower portions of the first tank. With the calcium carbonate mineral packed in the first upper portion, the fluorine in the waste water can be treated in both the first lower portion and the first upper portion. Therefore, the first upper portion has a waste water treating function and a exhaust treating function in combination. Thus, considerable saving can be achieved in the cost of construction and plant equipment.

(5) Crystalline calcium fluoride that is produced in the first tank is sprayed, together with circulating water, from a midportion of the first upper portion, so that circulating water can be supplied in greater quantities thereby to provide improved gas-liquid contact efficiency. The air lift pump can be operated with less power, and this involves lower running cost.

Two kinds of circulating water, namely, circulating water from the air lift pump and circulating water from the return sludge pump, can be placed in circulation.

(6) A sludge of a suitable concentration from a settling tank employed in waste water treatment is sprayed over the first and second upper portions. Soft slurry characteristics of aluminum hydroxide flocs formed by coagulants provide for further improvement in gas-liquid contact efficiency. Thus, those ingredients of exhaust gas which are required to be treated can be efficiently eliminated.

Recently, various new techniques for fluorine treatment which utilize calcium carbonate minerals have been developed. For example, Japanese Patent Application Laid-Open Publication No. 60-48191 teaches the utilization of a calcium carbonate mineral for treatment of fluorine-containing waste water. However, this publication teaches no method for treating waste water and exhaust gas at the same time.

Japanese Patent Application Laid-Open Publication No. 63-28429 teaches treating fluorine-containing waste water and exhaust gases. The utilization of calcium carbonate is disclosed in Japanese Patent Application Laid-Open Publication Nos. 5-253575; 5-253576; and 5-253577. However, these disclosures are solely concerned with treating of fluorine-containing waste water, and no teaching is made as to a method of treating exhaust gases simultaneously with waste water.

In comparison with these prior art techniques, the present invention has distinguished features as pointed out below.

The invention presents a waste water treating apparatus which is capable of treating both waste water and exhaust gas. According to the invention, waste water is introduced into a tank packed with a calcium carbonate mineral, and reaction is effected while the waste water is agitated by aeration; and a circulating water containing crystal seeds and microorganisms is utilized for exhaust gas treatment.

In the second tank in which waste water and exhaust gas are neutralized to a certain degree, microorganisms propagated in the tank are utilized for treatment of low-concentration fluorine. Specifically, fluorine is allowed to be taken into microbial bodies, and thereafter microorganisms and treated water are subjected to separation in a settling tank.

In the case of fluorine-containing waste water from a semiconductor plant, for example, the waste water contains sulfuric acid and this may prompt formation of crystal seeds containing calcium fluoride. This fact can be advantageously utilized. Generally, sulfuric acid separating devices are largely used at semiconductor plants, so that fluorine-containing waste water from such a plant usually has sulfuric acid contained therein.

In the second tank, organic matter present in the waste water and exhaust gas is advantageously utilized in conjunction with microorganisms for the treatment of both waste water and exhaust gas.

In reaction tanks containing calcium carbonate, airborne organisms can be utilized, because each of the reaction tanks is a top-open type and is under powerful agitation through air-based aeration.

Further, according to the invention, masses of sludge containing aluminum agent are returned to reaction tanks containing calcium carbonate (at the first and second upper portions, also first and second lower portions).

In Japanese Patent Application Laid-Open Publication Nos. 5-253578; 5-254829; 5-277471; 5-293475; and 5-301092, a teaching is given that a fluorine-containing water is supplied in circulation to a tank packed with calcium carbonate particles so as to enable calcium fluoride to be produced in the tank, fluorine being thus collected in the form of calcium fluoride.

In contrast to this, the present invention enables not only treatment of the fluorine in waste water but treatment of the fluorine in exhaust gas as well and, in addition, provides for a higher degree of treatment (secondary treatment) of the fluorine in both waste water and exhaust gas through utilization of microorganisms present in waste water and exhaust gas.

In the treating method of the invention, the first step lies solely in eluting calcium from the calcium carbonate mineral to allow a reaction between the calcium and the fluorine. At the second step, a higher degree of fluorine treatment is carried out in the second tank utilizing microorganisms, whereby low-concentration fluorine in both waste water and exhaust gas can be microbially treated. In the present invention, calcium carbonate minerals are utilized and any decrease in the loaded package of calcium carbonate mineral will be refilled. However, no collection is made of calcium fluoride.

Here, the difference between calcium carbonate and calcium carbonate mineral is explained. Calcium carbonate is a substance expressed by chemical formula $CaCO_3$, a specific example of which is calcium carbonate as an industrial chemical.

Calcium carbonate minerals include, for example, marble, lime stone, coral, and oyster shell, all of which are materials existing in nature. Generally, calcium carbonate minerals existing in nature comprise calcium carbonate, as a principal component, and about 1% of impurities, such as $SiO_2$ and MgO. The present invention takes advantage of inexpensive calcium carbonate minerals, produced in large quantities in Hiroshima, Japan, for system construction. The invention utilizes calcium carbonate minerals that exist in nature, and not calcium carbonate as an industrial chemical. Unlike calcium carbonate as an industrial chemical, natural calcium carbonate minerals involve no accidental trouble or hazard and are quite safe for use in fluorine treatment.

The use of slaked lime has an advantage that since the material is an industrial chemical in powder form, slaked lime slurry dissolved in water can fast react with the fluorine dissolved in waste water. That is, the fast reaction behavior of slaked lime in relation to fluorine provides an advantage that reaction tanks can be designed to be smaller in size. Specifically, reaction tanks may be generally so designed as to allow a detention time of less than 30 minutes. The calcium carbonate mineral used in the present invention is a material existing in nature as stated above and, therefore, time is required before it reacts with the fluorine in waste water. Experiments tell that the time requirement is of the order of several hours.

However, as may be well appreciated from a comparative illustration given in FIGS. 8A and 8B, one feature of the present invention is that a conventional adjustor tank is effectively utilized which is designed for a detention time of several hours simply for purposes of adjusting water quality and water quantity. More specifically, the adjustor tank is prepacked with a calcium carbonate mineral so that the tank has not only a function to adjust water quality and water quantity, but also has a new function to perform a physico-chemical treatment of fluorine, i.e., a reaction treatment through aeration.

Therefore, the lower portion of the first tank has a function to act as a reaction tank.

As FIG. 8B shows, the prior art practice is that waste water is introduced into the adjustor tank before it is put into a reaction tank so that variations in waste water concentration are equalized in the adjustor tank so as to enable a precalculated quantity of waste water to be supplied to the reaction tank. The detention time in the adjustor tank is several hours.

As FIG. 8A shows, according to the invention, waste water is treated over a time period of several hours in the lower portion (first reaction/adjustment tank) which acts as a conventional adjustor tank and concurrently as a reaction tank. Therefore, the use of calcium carbonate mineral, a material which reacts slow when compared with slaked lime, will not involve longer treating time than in the case of the prior art arrangement shown in FIG. 8(B). In the present invention, the lower portion (the first reaction/adjustment tank) has a combined function of adjustor tank and reaction tank, which results in a reduced number of tanks.

According to the present invention, a portion which acts as a conventional adjustor tank and a portion which acts as a reaction tank are integrated into one tank or a first reaction/adjustment tank which allows a detention time of several hours. This does not require the use of slaked lime, involves less production of solid waste, and permits use of an exceptionally low cost calcium carbonate mineral for reaction with fluorine.

Hitherto, an exhaust gas treating apparatus has been installed separately from a waste water treating apparatus. However, installing an exhaust gas treating apparatus and a waste water treating apparatus separately from each other requires a wide space and does not meet rationalization requirements.

Conventionally, it has been general practice that the fluorine in exhaust gases is brought in contact with water or an aqueous alkaline solution in the exhaust gas treating apparatus, being thus absorbed and dissolved in the water or aqueous alkaline solution. Subsequently, the aqueous solution into which the fluorine has been absorbed is introduced into the waste water treating apparatus, in which fluorine treatment is made through addition of chemicals, such as slaked lime. In other words, with the prior art treating arrangement, the fluorine in exhaust gas has been treated in two stages, namely, the stage of effecting solution contact, and absorption and dissolving by the solution, and the stage of causing calcium fluoride to be produced in the waste water treating apparatus.

In contrast, according to the invention, the fluorine in the exhaust gas can react directly with the calcium carbonate mineral, or is allowed to react with the calcium carbonate mineral in a short time. In this respect, the invention is completely different from the prior art.

Hitherto, as already stated, organic substances, such as organic solvents, in exhaust gases have generally been treated through activated carbon adsorption, followed by desorption, then treatment in the waste water treating apparatus. Therefore, such prior art apparatus is entirely different from the apparatus of the present invention in which direct microbial decomposition of organic substances is carried out utilizing microorganisms grown in the process of waste water treatment.

According to the invention, in waste water treatment, it is possible to reduce the cost of treatment with respect to waste water containing organic substances, such as fluorine and surface active agents, and dehydrated cake generation. At the same time, it is possible to treat fluorine and organic matter as contained in exhaust gas by utilizing currents of circulating water in which crystalline calcium chloride, a reaction product called "crystal seed", is mixed with masses of biological sludge separated from biological films; the calcium carbonate mineral which is reactable with fluorine, and the charcoal, a material capable of adsorbing organic substances; and biological films grown on the surface of the charcoal. Furthermore, such awkward items as slime and solid matter which have usually been produced in conventional exhaust gas treating apparatus can be automatically easily dehydrated and removed by means of such components as settling tank and dehydrator of the waste water treating apparatus of the present invention. Thus, the invention also provides for good improvement in ease of operation and maintenance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the apparatus and method for waste water treatment of the present invention will now be described in detail with reference to the accompanying drawings.

Figure 1:
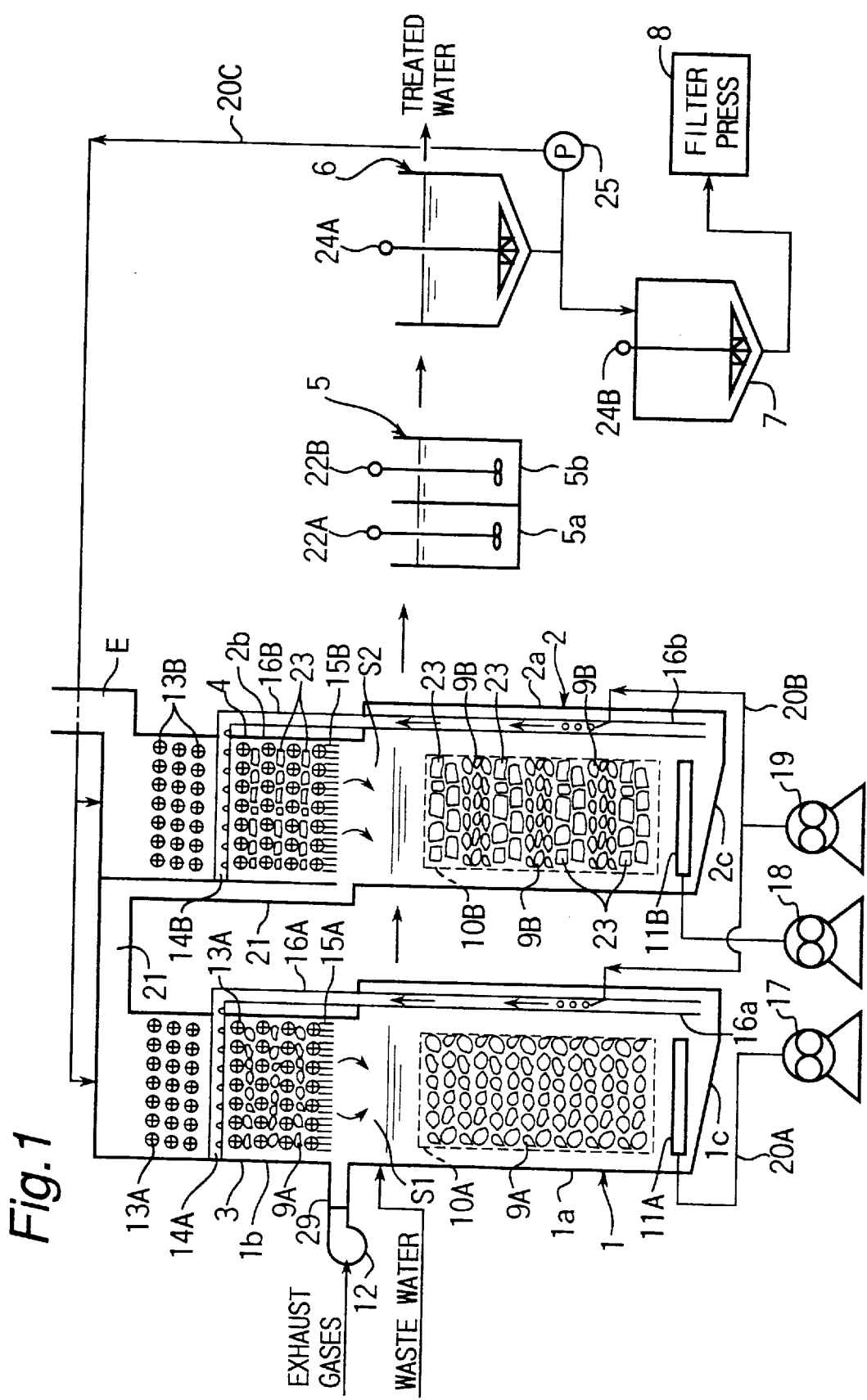
FIG. 1 is a conceptional view of an embodiment of the waste water treating apparatus in accordance with the present invention.

Referring to FIG. 1, there is shown a first embodiment of the waste water treating apparatus in accordance with the invention. This first embodiment is intended for treatment of waste water containing fluorine and organic matter and also of exhaust gas containing fluorine and organic matter.

In FIG. 1, reference numeral 1 designates a reaction/adjustment tank. The reaction/adjustment tank 1 has a first lower portion 1a which is filled with a calcium carbonate mineral 9A accommodated in a placement basket 10A. The first reaction/adjustment tank 1 includes a blower 17, piping 20A extending from the blower 17, and a diffuser pipe 11A connected to one end of the piping 20A. The diffuser pipe 11A is placed at the bottom of the first lower portion 1a of the first reaction/adjustment tank 1. The blower 17, piping 20A, and diffuser pipe 11A constitute aeration means.

A waste water containing fluorine and organic matter discharged from a manufacturing process of a semiconductor plant or liquid crystal plant is initially introduced into the first reaction/adjustment tank 1. The fluorine-containing waste water contains sulfuric acid. The sulfuric acid content may be treated simply by adjusting the pH of the waste water.

The level of the waste water in the first reaction/adjustment tank 1 is adjusted so that the calcium carbonate mineral 9A is submerged under the waste water. The waste water is vigorously agitated by the aeration means including the diffuser pipe 11A and blower 17. Through this agitation there occurs a reaction between the fluorine in the waste water and the calcium in the calcium carbonate mineral 9A in the course of time lapse. Since sulfuric acid is present in the waste water, the waste water is characteristically acid. This facilitates the elution of calcium from the calcium carbonate mineral 9A. Through the above reaction, therefore, a crystalline calcium fluoride (crystal seed) is easily produced.

In a first upper portion 1b of the first reaction/adjustment tank 1 there is disposed a first reaction spray unit 3 which is filled with a calcium carbonate mineral 9A and a plastic filler 13A. A space S1 for exhaust gas introduction is provided beneath the first reaction spray unit 3, and laterally from the space S1 there extends a duct 29 which communicates with the space S1. An exhaust fan is mounted to a distal end of the duct 29 such that exhaust gases containing fluorine and organic matter discharged from the semiconductor plant or liquid crystal plant are introduced by means of the exhaust fan 12 into the space S1 located beneath the first reaction spray unit 3 for exhaust gas introduction.

A lattice plate 15A is provided at a lowermost portion of the first reaction spray unit 3. The lattice plate 15A, as shown in FIG. 1, has a vertically extending lattice and its vertically projected area is far much smaller than its transversely projected area. This permits exhaust gas from the duct 29 to easily pass through the lattice plate 15A to reach the first reaction spray unit 3. The lattice plate 15A is required to have relatively high strength so as to be able to support both the plastic filler 13A and the calcium carbonate mineral 9A of comparatively heavy weight.

Materials useful as the plastic filler 13A, which is packed in the first reaction spray unit 3, specifically include Raschig ring, Bellel saddle, interlock saddle, Terralet, and ball ring, which may be suitably selected. These are used in conventional exhaust gas treating apparatuses and are less subject to air resistance.

At location slightly higher than a vertically median site of the first reaction spray unit 3 there is disposed a water spray pipe 14A which transversely extends through the first reaction spray unit 3 and to which is connected an air lift pump 16A. The air lift pump 16A comprises a pipe which extends downward until its lower end reaches a location adjacent the bottom of the lower portion 1a of the first reaction/adjustment tank 1. Connected to the air lift pump 16A, at a site slightly above its lower end 16a, is a pipe extending from a blower 19 which supplies air for operating the air lift pump 16A. As the air lift pump 16A is operated, the waste water present at the bottom of the first lower portion 1a of the first reaction/adjustment tank 1 ascends in the interior of the air lift pump 16A so that the waste water is sprayed from the spray pipe 14A into the first reaction spray unit 3.

A pump equipped with a crusher of the type which is in conventional use may be employed in place of the air lift pump 16A. However, the air lift pump 16A, when selected, provides an advantage that a larger quantity of waste water can be transported at a relatively low power cost. Where the air lift pump 16A is used, it is possible to effectively destroy crystalline calcium fluoride (crystal seed), as will be described hereinafter. Use of any pump other than air lift pump involves possibilities of pump clogging.

The first reaction/adjustment tank 1 is preferably so designed that the pH of the waste water, when treated in the first reaction/adjustment tank 1, be rendered neutral.

Specifically, when the pH of the waste water containing fluorine and organic matter is 3 or lower, it is preferred that the detention time in the first reaction/adjustment tank 1 be several hours or more, though it may vary depending upon the degree of agitation.

When air supply for aeration is provided in the quantity of more than 100 cubic meter per day per cubic meter of the capacity of the first reaction/adjustment tank 1, waste water agitation in the first reaction/adjustment tank 1 can be sufficiently performed; the reaction between the fluorine in the waste water and the calcium carbonate mineral 9A can be smoothly carried out; and any crystalline calcium fluoride (crystal seed) formed by the reaction can be prevented from adhering to the surface of the calcium carbonate filler 9A.

The bottom of the first reaction/adjustment tank 1 has a surface 1c which is downwardly inclined toward the lower end 16a of the air lift pump 16A. Since the bottom surface 1c is inclined in this way, the calcium fluoride crystal formed during the reaction may be easily directed toward the lower end 16a of the air lift pump 16. This facilitates the introduction of the calcium fluoride crystal into the first reaction spray unit 3 of the upper portion 1b.

The waste water, i.e., the water being treated, which has been circulated by means of the air lift pump 16 between the first lower portion 1a and the first upper portion 1b of the first reaction/adjustment tank 1 for fluorine treatment, is introduced into a second reaction/adjustment tank 2. Specifically, the waste water which has been treated in the first reaction/adjustment tank 1 is transferred to the second reaction/adjustment tank 2 via an overflow pipe (not shown) provided at a certain site located higher than lower portion 1a of the first reaction/adjustment tank 1 but lower than the space S1.

The exhaust gas, i.e., the gas being treated, which has been treated with respect to its fluorine content by being passed through the first reaction spray unit 3 vertically upward, is introduced into a space S2 for exhaust gas introduction via a duct 21 connected to the uppermost portion of the first reaction/adjustment tank 1, the space S2 being located beneath a second spray unit 4 provided in a second upper portion 2b of the second reaction/adjustment tank 2.

The second reaction/adjustment tank 2 has a filler packed therein which includes a calcium carbonate mineral 9B and charcoal 23. A diffuser pipe 11B for agitating the interior of the tank by air is disposed at the bottom of the second lower portion 2a of the second reaction/adjustment tank 2. The bottom of the second reaction/adjustment tank 2 has a surface 2c inclined toward the lower end 16a at which the air lift pump 16 is open, so as to facilitate the introduction by the air lift pump of calcium fluoride crystals (crystal seeds) produced into the second reaction spray unit.

The calcium carbonate mineral 9B and charcoal 23 packed in the second reaction/adjustment tank 2 is a biologically fixed substrate for microorganisms, so that a biological film may be formed on the surfaces of the calcium carbonate mineral 9B and charcoal 23 over time. In case that an excess sludge or activated sludge produced in a separate biological treatment facility is introduced into the second reaction/adjustment tank 2, it is possible to expect quick deposition of biological films on the biologically fixed substrate. Also, by introducing activated sludge regularly into the second reaction/adjustment tank 2 it is possible to constantly secure target biological films. Any organic matter in the waste water is treated by microorganisms in biological films formed on the surfaces of the calcium carbonate mineral 9B and charcoal 23.

For the charcoal 23 as a filler is chosen "Bitchotan", a charcoal which has a specific gravity of more than 1 so that it will be submerged under water. Any organic matter adsorbed on the "Bitchotan" or charcoal 23 is treated by microorganisms propagated in the interior of charcoal 23.

Charcoal 23 with microorganisms propagated therein may be generally called "activated charcoal". For the calcium carbonate mineral 9B is used a ground product of natural limestone. Such a ground product is commercially available under the name of "heavy-duty calcium carbonate" or "Kansuiseki". Among calcium carbonate minerals which exist in nature, natural limestone, inter alia, is a chemically safe material such that small fishes can be bred in an aquatic tank in which grinds of the mineral are placed. Grinds of natural lime stone have a rough surface which provides ready access for microbial propagation and formation of biological films.

Since the pH of the waste water is 3 or below on the acid side, the calcium carbonate mineral 9A packed in the first reaction/adjustment tank 1 should preferably have an initial particle size which is larger than the particle size of the calcium carbonate mineral 9B packed in the second reaction/adjustment tank 2 and is of a coarser range. For example, it is preferable that the calcium carbonate mineral 9A in the first reaction/adjustment tank 1 has a particle size of 5 to 7 cm in diameter, whereas the calcium carbonate mineral 9B in the second reaction/adjustment tank 2 has a particle size of about 2 cm in diameter.

The water under treatment which has been treated in the second reaction/adjustment tank 2 is introduced into a third tank 5 via an unillustrated overflow pipe disposed adjacent an upper end of the second lower portion 2a.

Coagulants, i.e., aluminum agent and polymer coagulant, are added to the third tank 5. In case that the fluorine concentration is lower than 20 ppm, the more the water being treated is close to neutral, the more efficiently is it possible to remove fluorine from the water being treated. Therefore, initially in the first reaction/adjustment tank 1, the fluorine concentration in the waste water is brought to a level of lower than 20 ppm by virtue of the calcium carbonate mineral 9A, and the pH is brought close to 7. Next, in the second reaction/adjustment tank 2, in order to effect a higher degree of fluorine removal with respect to the waste water, the fluorine in the waste water is subjected not only to reaction with the calcium carbonate mineral 9B, but also to biological treatment by microorganisms, so that the fluorine concentration in the waste water is lowered to less than 15 ppm. Finally, an aluminum agent, such as polyaluminum chloride, and polymer coagulant are poured into respective tanks of the third tank 5. More specifically, the aluminum agent is added to a first stage tank 5a of two component tanks of the third tank 5, and the polymer coagulant is added to a second stage tank 5b. Thus, the water being treated can be treated to a target water quality or a fluorine concentration level of less than 5 ppm.

The water being treated which has undergone the treatment in the third tank 5 is then transferred to a fourth tank 6. The fourth tank 6 is of same arrangement as conventional first settling tank.

A fifth tank 7 corresponds to conventional sludge coagulation tank in which masses of sludge from the first reaction/adjustment tank 1 and the second reaction/adjustment tank 2 are coagulated. The sludge thus coagulated is transferred to a filter press 8 which act as a dehydrator.

In the above described embodiment, the first upper portion 1b of the first reaction/adjustment tank 1 and the second upper portion 2b of the second reaction/adjustment tank 2 constitute an exhaust gas treating apparatus.

In this embodiment, calcium carbonate minerals 9A and 9B are respectively packed in the first and second lower portions 1a, 1b and, through the operation of the aeration device as agitator means, the water being treated is neutralized and the fluorine contained in the water being treated is caused to react with the calcium carbonate minerals 9A and 9B, whereby the fluorine concentration of the water being treated can be reasonably reduced. Therefore, the apparatus of this embodiment is smaller in size as a whole as compared with a combined area of prior art separate apparatuses for waste water treatment and exhaust gas treatment.

In the waste water treating apparatus of the above arrangement, since the pH of the waste water just after its entry into the first reaction/adjustment tank 1 is 3 or lower, that is, on the acid side, the calcium carbonate mineral 9A is allowed to become dissolved and its calcium component is ionized meanwhile, whereby the fluorine contained in the waste water is formed into fine flocs of calcium fluoride and crystal seeds. As a result of this treatment, carbonic acid gas and water are produced. In this embodiment, the fluorine can be caused to react with the calcium carbonate mineral 9A in the first reaction/adjustment tank 1, just according to the chemical reaction formula. The reason is that since the first reaction/adjustment tank 1 has a combined function of a conventional adjustor tank and a reaction tank, the reaction time in the first reaction/adjustment tank 1 can be set longer than that in the conventional reaction tank.

More particularly, hitherto, excess slaked lime ($Ca(OH)_2$) has been added to the reaction tank and this has resulted in generation of hydroxide in large amounts. In contrast, according to the present embodiment, sufficient time is taken to cause the fluorine to react with the calcium carbonate mineral in exact accordance with the chemical reaction formula. Therefore, without such hydroxide generation as has usually been the case with the prior art, it is possible to reduce the production of dehydrated cake as compared with the prior art level and to effectively remove the fluorine contained in the waste water. In this way, in the first reaction/adjustment tank 1, the fluorine contained in the waste water (fluorine concentration in waste water: 50 ppm) can be treated at a removal rate of more than 60%.

Next, the waste water, which has had its fluorine concentration reduced to 20 ppm and has been brought close to neutral, is introduced into the second reaction/adjustment tank 2. In the second reaction/adjustment tank 2, the detention time for the waste water being treated is preferably several hours or more. Layers of calcium carbonate mineral 9B and charcoal 23 are stacked in vertically alternate relation in the second lower portion 2a of the second reaction/adjustment tank 2. Biological films are formed over time on the surfaces of the calcium carbonate mineral 9B and charcoal 23. These biological films serve for the treatment of organic matter in the waste water.

The calcium carbonate mineral 9B packed within the second reaction/adjustment tank 2 reacts with the fluorine in the waste water and serves to reduce fluorine concentration. It is noted, however, the rate of fluorine removal in the second reaction/adjustment tank 2 is lower than that in the first reaction/adjustment tank 1. The reason is that the quantity of calcium carbonate mineral 9B packed in the second reaction/adjustment tank 2 is smaller than that in the first reaction/adjustment tank 1. Thus, in the second reaction/adjustment tank 2, the fluorine contained in the waste water can be removed more than 30%. When organic substances, such as surface active agents, are taken in terms of COD (chemical oxygen demand), a removal rate of more than 40% can be expected.

The waste water being treated which has undergone treatment in the second reaction/adjustment tank 2 is then transferred to the third tank 5. In the third tank 5, an inorganic coagulant (not shown), i.e., an aluminum agent (inorganic coagulant), such as polyaluminum chloride, and a polymer coagulant are respectively added to the first and second stage tanks 5a and 5b. In this third tank 5, the aluminum agent reacts with the fluorine contained in the waste water to produce aluminum fluoride, and any excess aluminum agent quickly changes into flocs of aluminum hydroxide, which in turn adsorbs aluminum fluoride. Through this process is it possible to reduce the fluorine concentration of the waste water to a level of about 5 ppm. It is known that aforesaid flocs of aluminum hydroxide are likely to be produced in the vicinity of neutrality. The reaction time in the third tank 5 may be about 15 minutes.

Next, the waste water is transferred to a fourth tank 6 which functions as a settling tank. In this fourth tank 6, a collector 24A is operated at a speed of about one turn for a few minutes for effecting solid-liquid separation. A supernatant of the waste water is discharged as treated water, while sludge formed by settling is transferred to a fifth tank 7 which functions as a sludge concentrating tank. In this fifth tank 7, flocs of sludge are collected by a collector 24B and the collected sludge is concentrated through sedimentation over 3 hours or more. Thereafter, the sludge concentrated by sedimentation is transferred to a filter press 8 which functions as a dehydrator and is subjected to dehydration. Thus, dehydrated cake, as a final solid waste, is produced.

The sludge which has been separated in the fourth tank 6, i.e., a settling tank, is returned by a return sludge pump 25 to one or both of the first spray unit 3 and second spray unit 4. The returned sludge serves for purposes of treating exhaust gas as well as waste water in the first reaction/adjustment tank 1 or the second reaction/adjustment tank 2.

The second reaction spray unit 4 is packed with charcoal 23 as well as with plastic filler 13B. In the second reaction spray unit 4, layers of plastic filler 13B and charcoal 23 are placed in vertically alternate relation. This arrangement is intended to equalize total draft resistance in the second reaction spray unit 4 as far as possible.

On the surface of the charcoal 23 there will be formed a biological film over time, which facilitates treating operation with respect to organic matter in exhaust gas. Further, chemical sludge and biological sludge returned from the return sludge pump 25 are sprayed over the second reaction spray unit 4. In this way, the chemical sludge and biological sludge can be utilized in the treatment of a trace amount of fluorine and organic substances in the exhaust gas.

With respect to the quantity of such return sludge, operation control is made so that such sludge will not cause any clogging trouble at the second reaction spray unit 4 or at the filler packed portion of the second reaction/adjustment tank 2. Specifically, in operation, the quantity of sludge for return from the return sludge pump 25 to the second reaction spray unit 4 as well as to the second reaction/adjustment tank 2, and also SS concentration are controlled so as to avoid such clogging. More specifically, the quantity of return sludge is controlled by ensuring that there is no clogging at the second reaction spray unit 4, and by determining SS concentration in the second reaction/adjustment tank 2 and keeping it at a proper level.

Therefore, when the quantity of return sludge from the return sludge pump 25 to the second reaction spray unit 4 is decreased, sludge is drawn from the fourth tank 6 into the fifth tank (concentration tank) 7. The quantity of sludge to be drawn into the fifth tank 7, and the quantity of sludge to be returned from the return sludge pump 25 are controlled by a sludge metering box (not shown) provided in the lower portion of the fifth tank (concentration tank) 7. Such operation control is quite similar to the practice of return sludge control by a sludge metering box with respect to activated sludge in conventional waste water treatment.

As counter measures against possible sludge clogging, the following two measures (1), (2) may be mentioned.

(1) For the plastic fillers 13A and 13B, those of the type which is not liable to sludge clogging, i.e., those having a diameter of 100 mm or more, should be selected, whereby possible clogging due to sludge can be almost completely prevented. Plastic fillers of the type having a diameter of 100 mm or more are commercially available.

Figure 3:
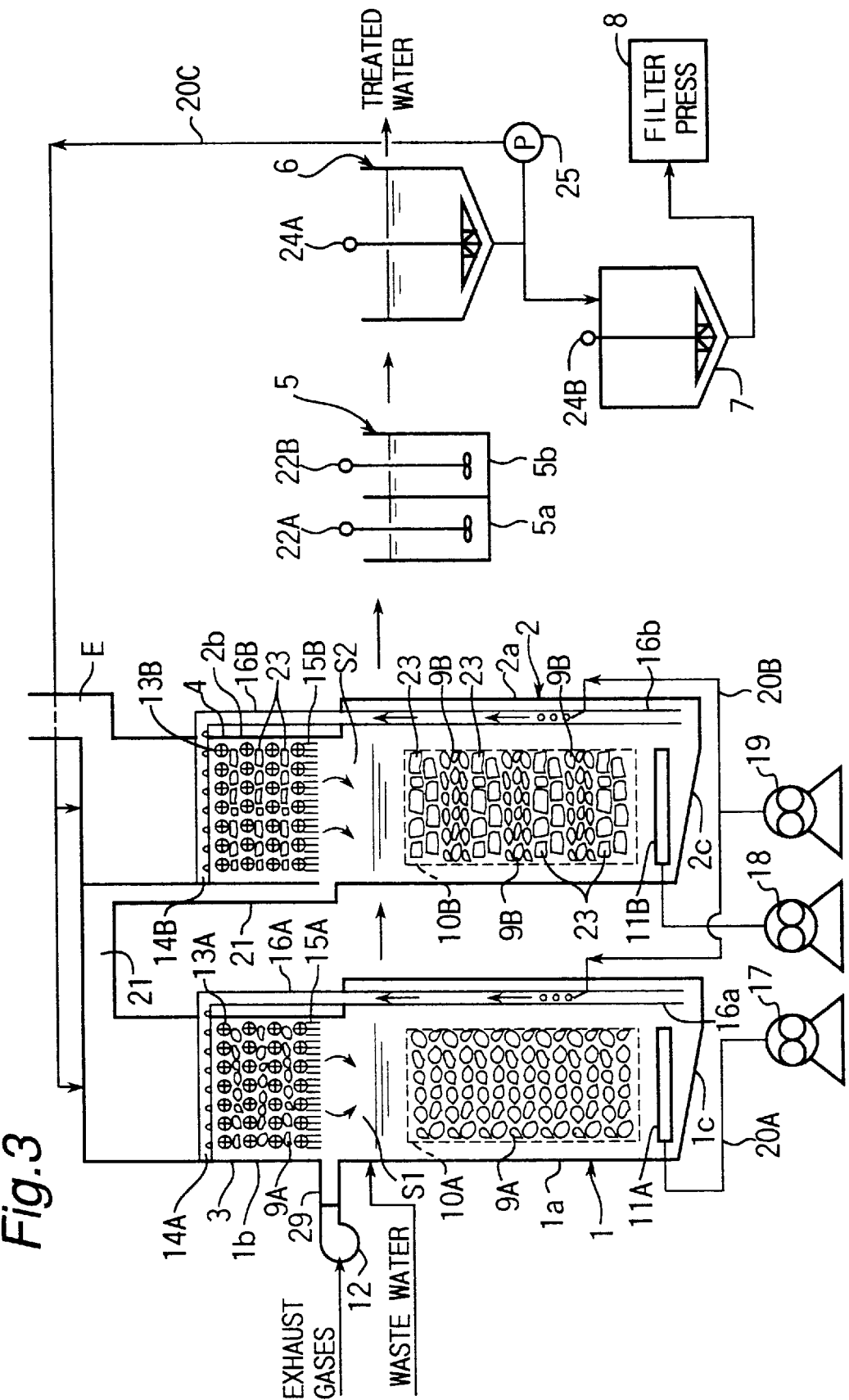
FIG. 3 is a conceptional view showing a modified form of the embodiment shown in FIG. 1.
Figure 4:
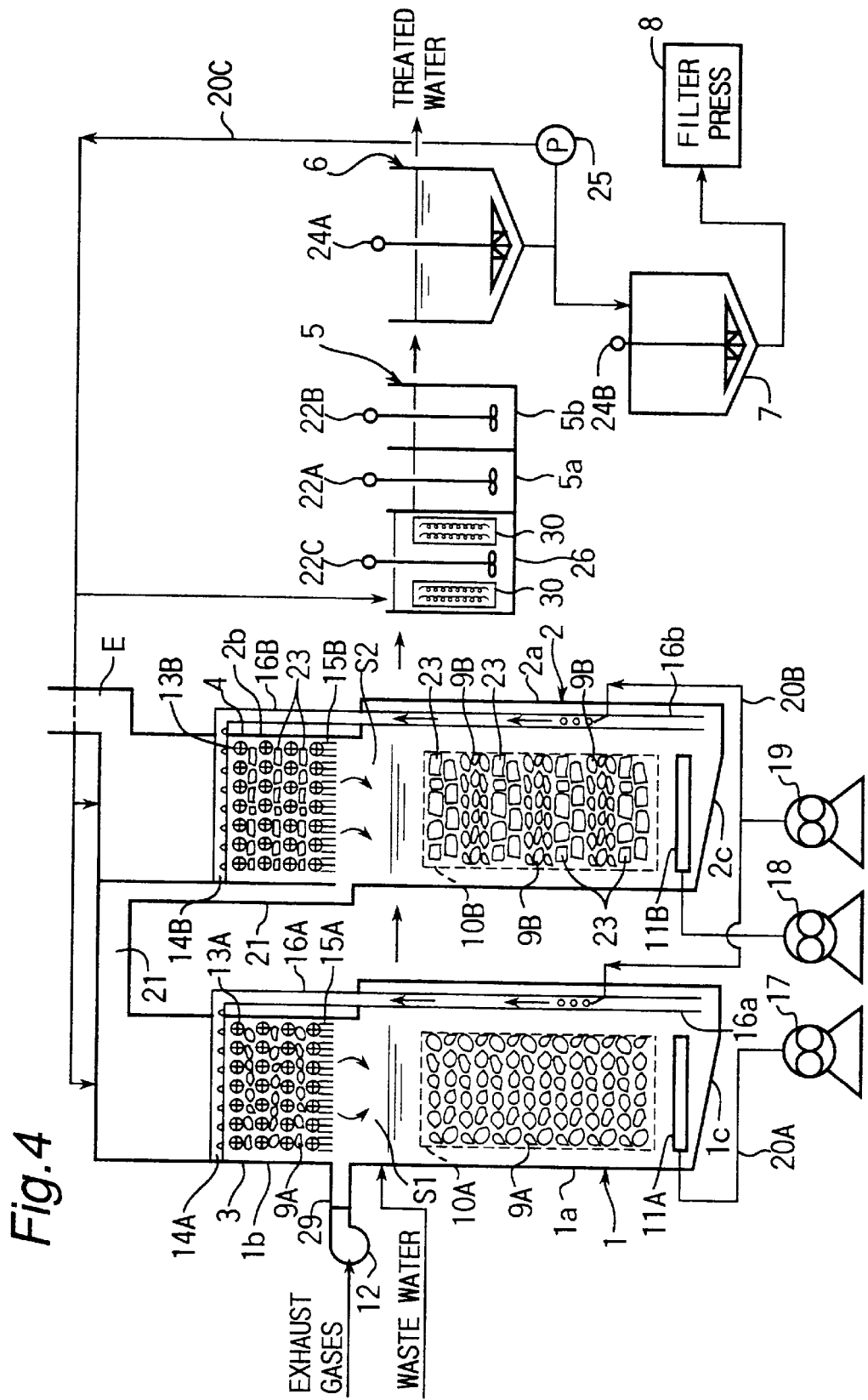
FIG. 4 is a conceptional view showing a modified form of the waste water treating apparatus shown in FIG. 2.
Figure 5:
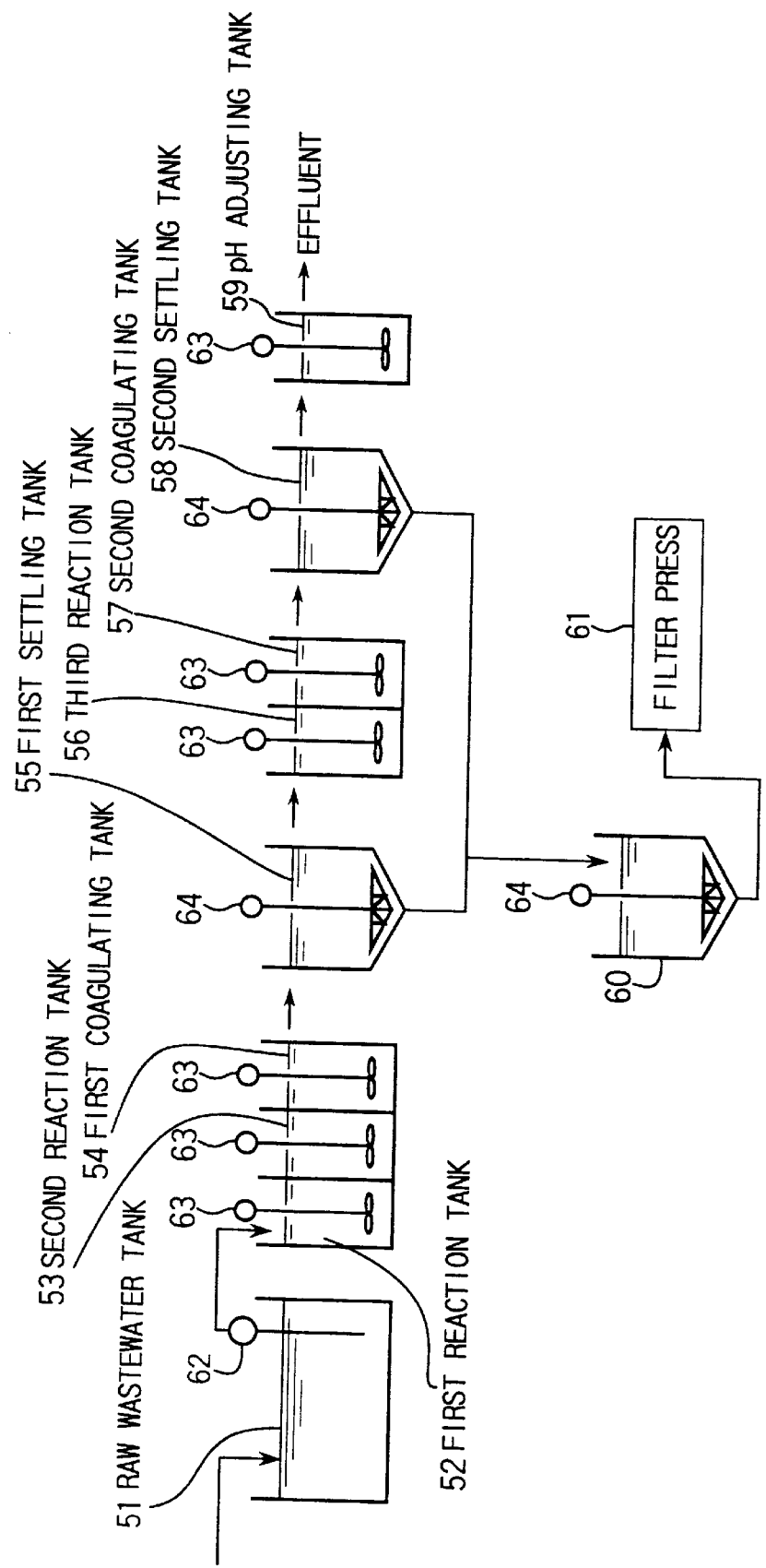
FIG. 5 is a conceptional view showing a conventional waste water treating apparatus.
Figure 6:
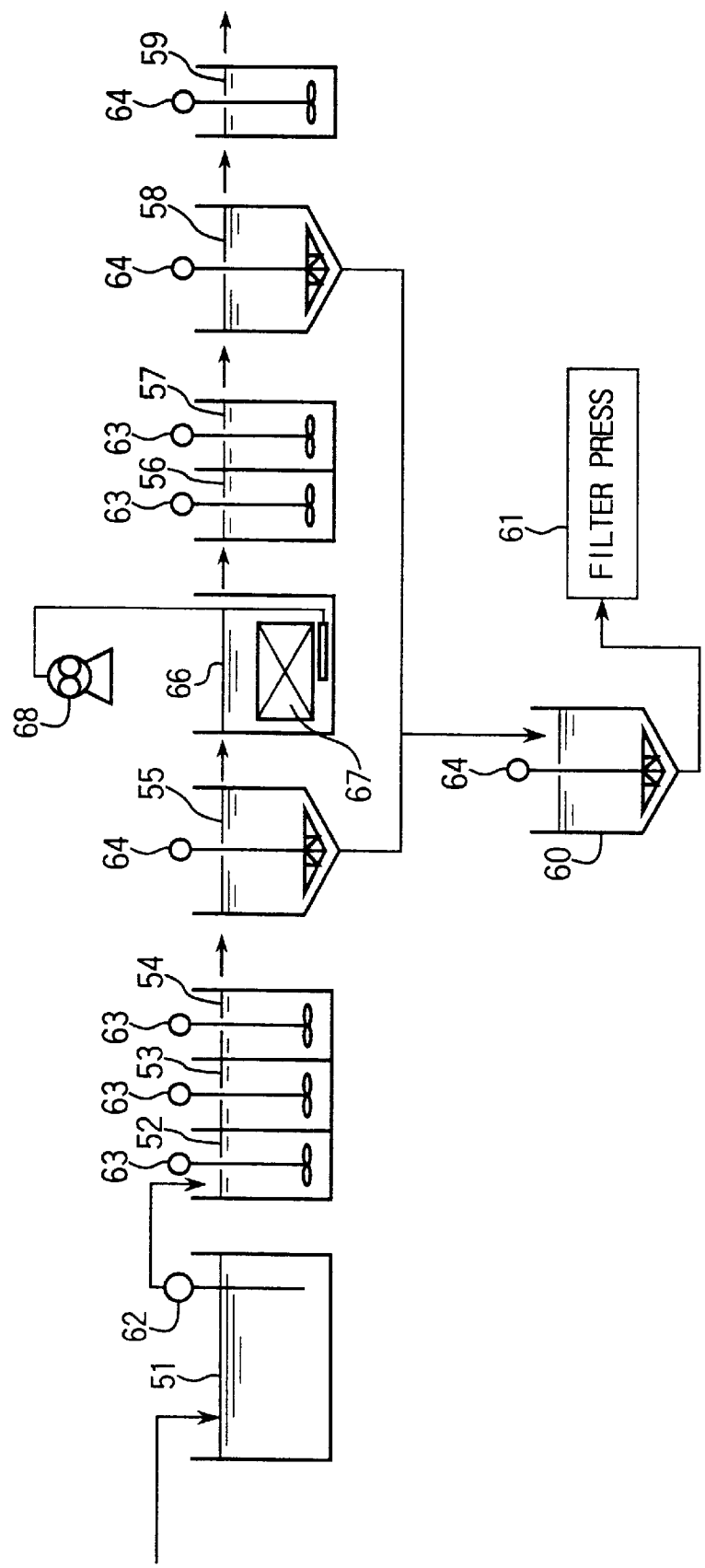
FIG. 6 is a conceptional view of a conventional waste water treating apparatus including a biological treatment unit.
Figure 7:
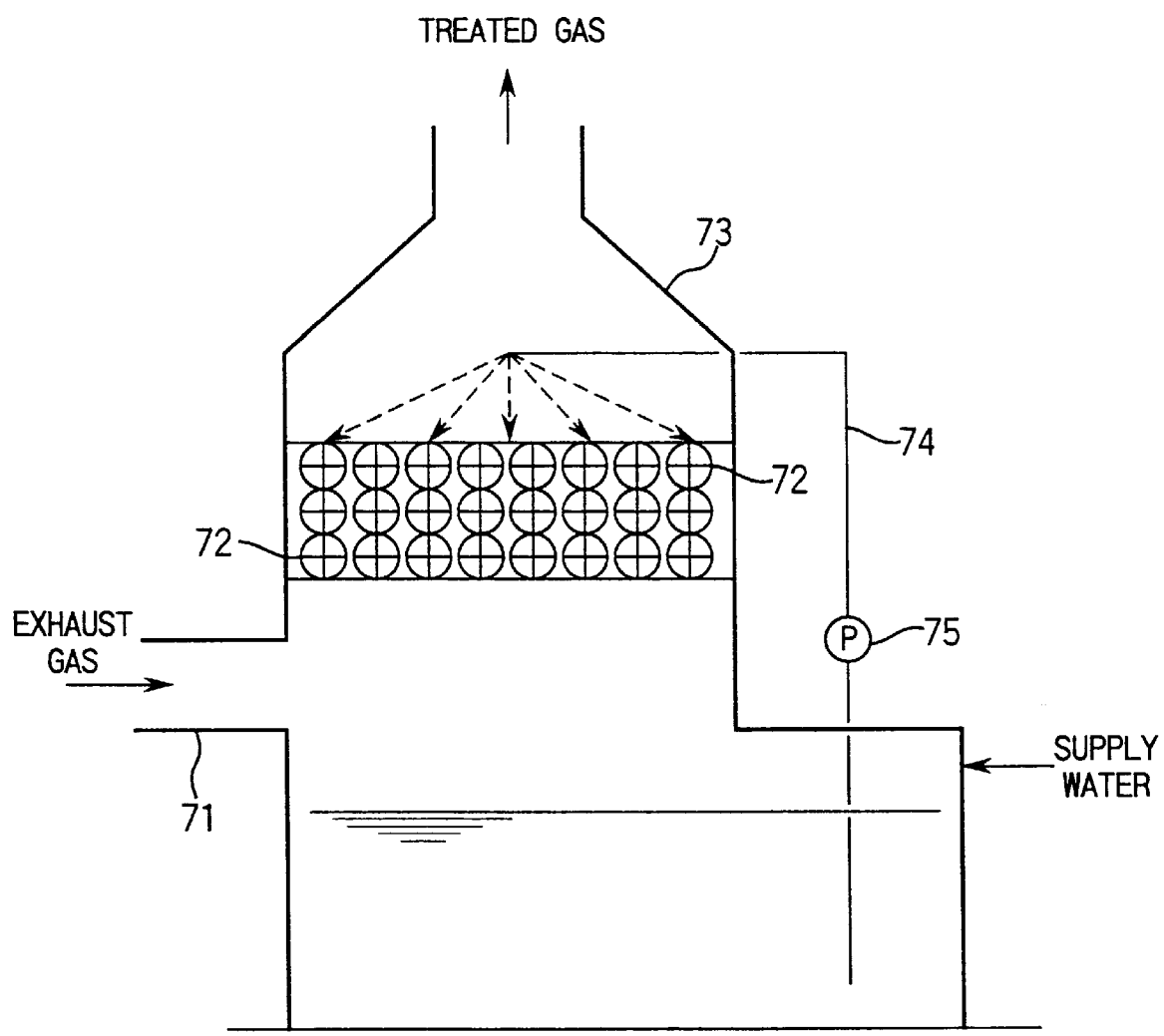
FIG. 7 is a conceptional view of a conventional exhaust gas treating apparatus.
Figure 8A:
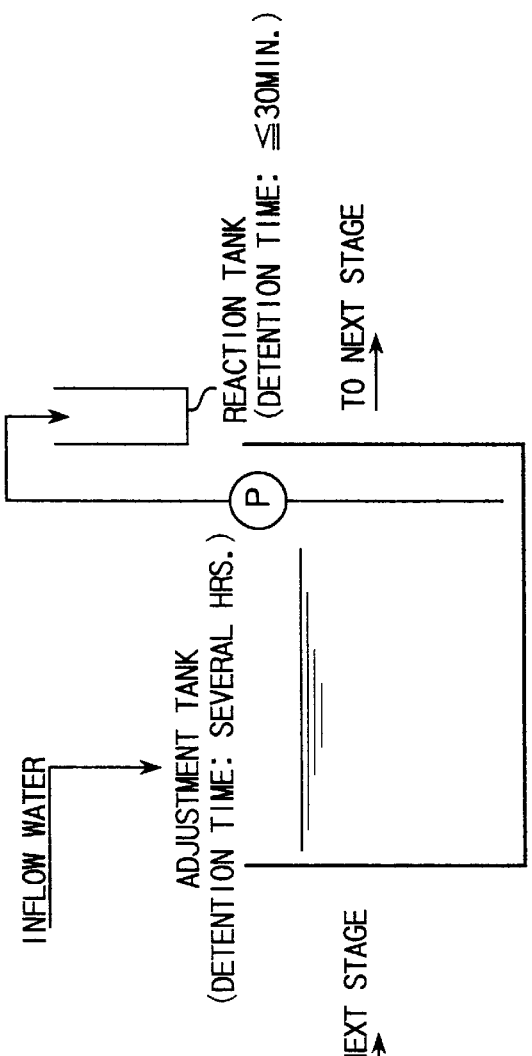
FIG. 8A is a conceptional view showing a first lower portion in the present invention.
Figure 8B:
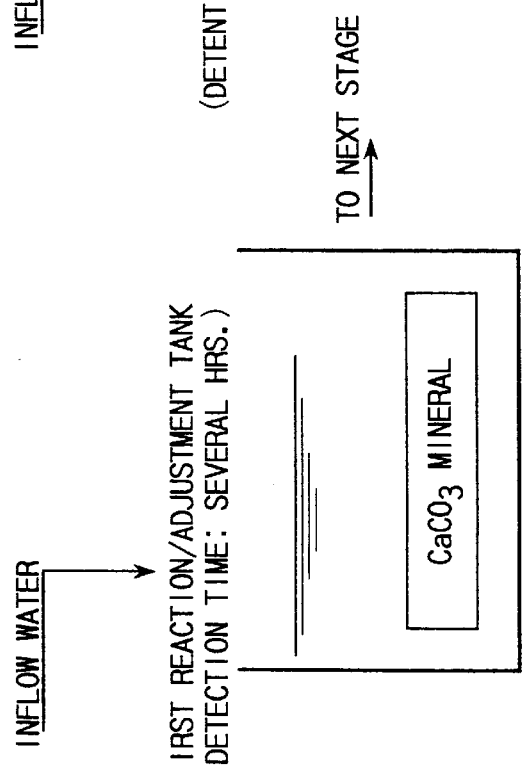
FIG. 8B is a conceptional view showing in part a conventional waste water treating apparatus.

(2) As may be appreciated from FIGS. 3 and 4, care should be used to avoid plastic filler 13A being loaded on the spray pipe 14A which extends across the first reaction spray unit 3 and also to avoid plastic filler 13B being loaded on the spray pipe 14B which extends across the second reaction spray unit 4. By so doing it is possible to prevent clogging due to sludge at the first and second reaction spray units 3 and 4.

In the present embodiment, two types of circulating water are sprayed over the first and second reaction spray units 3 and 4, so that improved treating efficiency can be obtained with respect to waste water and exhaust gas in the first and second reaction/adjustment tanks 1 and 2. By the expression "two types of circulating water" is meant water that is circulated in the first and second reaction/adjustment tanks 1, 2 by the air lift pumps 16A, 16B, and water contained in the sludge which is returned to the first and second reaction/adjustment tanks 1, 2 by the return sludge pump 25.

Next, one embodiment of the waste water treating method of the present invention will be explained with reference to FIG. 2.

Figure 2:
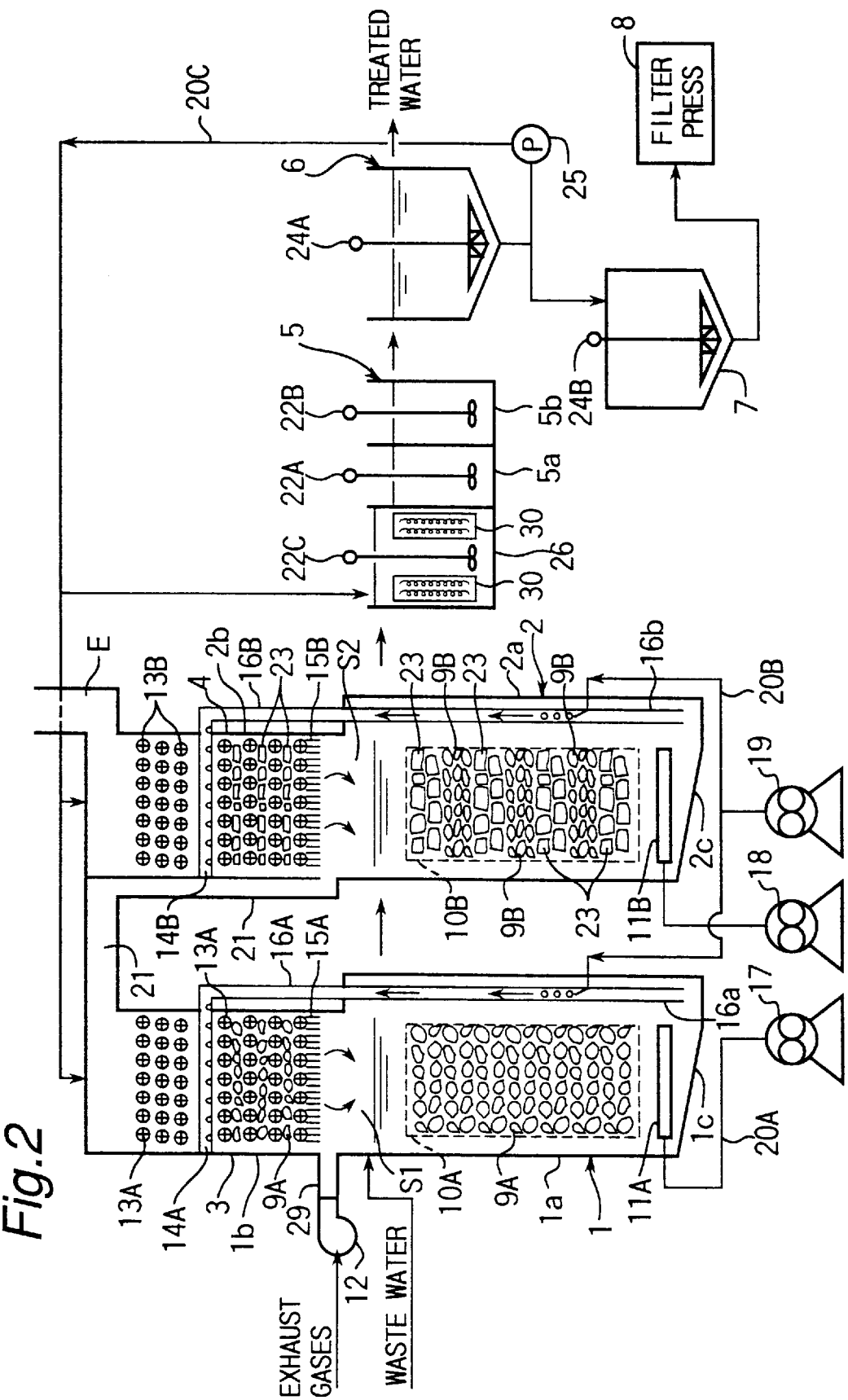
FIG. 2 is a conceptional view of a waste water treating apparatus for explaining an embodiment of the waste water treating method according to the invention.

The waste water treating apparatus shown in FIG. 2 is different from the waste water treating apparatus shown in FIG. 1 only in that a sludge fixing tank 26 having a sludge fixing portion 30 is provided prior to the first stage tank 5a of the third tank 5 of the apparatus shown in FIG. 1. Therefore, parts identical with those of apparatus in FIG. 1 are designated by like reference numerals and/or characters, and detailed description thereof is omitted.

The sludge fixing portion 30 contains vinylidene chloride, for example.

In this embodiment, waste water is first transferred to the first reaction/adjustment tank 1, in which the fluorine contained in the waste water is removed and neutralized by the calcium carbonate mineral 9A packed in the first lower portion 1a of the first reaction/adjustment tank 1. For example, where the quantity of air discharged from the air diffuser 11A for use in aeration is 100 cubic meters per day per cubic meter of the tank capacity in the first reaction/adjustment tank 1, if waste water, with pH 2.5 and a fluorine concentration of 50 ppm, is introduced into the first reaction/adjustment tank 1, the waste water may, at the outlet of the first reaction/adjustment tank 1, have pH 4–5 and a fluorine concentration of 20 ppm or lower.

The waste water with a fluorine concentration of 20 ppm or lower is discharged from the first reaction/adjustment tank 1 and is transferred to the second reaction/adjustment tank 2. In the second reaction/adjustment tank 1, the fluorine concentration of the waste water is lowered to 15 ppm or less and the pH is adjusted to 5–7.

Next, the water being treated is introduced from the second reaction/adjustment tank 2 into the sludge fixing tank 26, a foremost stage of the third settling tank 5.

In the sludge fixing tank 26, the water under treatment, with its fluorine concentration already lowered to 15 ppm and its COD concentration lowered to 15 ppm as well, is biochemically treated with respect to both its organic content and its fluorine content. In this biochemical treatment, "bio" means treatment by biological sludge, and "chemical" means treatment by coagulant-originated sludge. Specifically, the organic matter and fluorine in the waste water is treated by biological sludge and chemical sludge that are formed on the vinylidene chloride contained in the sludge fixing tank 26. Needless to say, the vinylidene chloride is capable of immobilizing both biological sludge and chemical sludge. Since organic substances, such as surface active agents and organic solvents, are taken as COD, waste water of COD 15 ppm is treated to a level of COD 3 ppm or lower in the sludge fixing tank 26. Meanwhile, the fluorine concentration is also lowered in the sludge fixing tank 26. In the fourth tank 6, after the waste water is subjected to solid-liquid separation, the fluorine concentration of the waste water is already at a level of 3 ppm or less.

After passing through the sludge fixing tank 26, the water under treatment is transferred to the first stage tank 5a and second stage tank 5b of the third tank (coagulating tank) 5. In this third tank (coagulating tank) 5, inorganic and polymer coagulants are added and fine flocks formed in the first and second reaction/adjustment tanks 1, 2 are grown larger by the inorganic and polymer coagulants.

After the water being treated is introduced into the third tank 5, first, inorganic coagulants, such as polyaluminum chloride and aluminum sulfate, a chemical called "sulfuric band", are added in the first stage tank 5a of the third tank 5, and then a polymer coagulant is added in the second stage tank 5b of the third tank 5 to permit floc growth into larger flocs.

Next, the water being treated is transferred to the fourth tank (settling tank) 6. The collector 24A is rotated at a speed of about one turn for each several minutes for solid-liquid separation with respect to the water under treatment, and the resulting supernatant is discharged as treated water. Whilst, sludge formed by sedimentation which contains unreacted aluminum, calcium and fluorine is returned to the sludge fixing tank 26 via the return sludge pump 25. The sludge fixing tank 26 is packed with vinylidene chloride by which sludge is immobilized.

Mixture sludge formed by sedimentation in the fourth tank 6, which includes chemical sludge containing unreacted aluminum and calcium as a reaction product, and biological sludge separated from biological films, is returned to the first spray unit 3 and/or the second spray unit 4 via the return sludge pump 25. The mixture sludge so returned is naturally utilized for exhaust gas treatment, and further it is allowed to move to respective lower portions 1a and 1b of the first and second reaction/adjustment tanks 1 and 2 for being utilized in waste water treatment as well.

In FIG. 1 embodiment, the sludge return efficiency of the return sludge pump 25 is at 100% at the initial stage of test operation, but as the concentration of sludge in the first reaction/adjustment tanks 1 and 2 exceeds 1000 ppm, the sludge return efficiency is set lower than 100%. The reason for this is that if operation is continued at 100% sludge return efficiency, sludge clogging due to the mixture sludge may occur at filler packages packed respectively in the first reaction/adjustment tank 1, second reaction/adjustment tank 2, first spray unit 3, and second spray unit 4. In other words, control is exercised with respect to sludge return efficiency so as not to cause sludge clogging.

In short, it is essential that sludge concentration be controlled at the first reaction/adjustment tank 1, the second reaction/adjustment tank 2, the first spray unit 3, and the second spray unit 4 in order to prevent any clog occurrence due to sludge.

In the waste water treating method which employs the waste water treating apparatus illustrated in FIG. 2, the sludge return efficiency of the return sludge pump 25 is controlled so that the sludge concentration in the sludge fixing tank 26 at the foremost stage of the third tank 5 is more than 3000 ppm, whereby the method can be a more effective waste water treating method with respect to organic matter and fluorine as compared with the waste water treating method which employs the waste water treating apparatus shown FIG. 1.

For the sludge fixing material contained in the sludge fixing tank 26, besides aforesaid vinylidene chloride, various types of fixing materials are available. However, for purposes of immobilizing chemical sludge and biological sludge, vinylidene chloride is comparatively effective.

As the final stage operation for sludge treatment, the sludge transferred from the fourth tank 4 to the fifth tank 7 is concentrated, transferred to the filter press 8 as a dehydrator, dehydrated by the filter press 8 and thus made into dehydrated cake.

Specific experimental examples are given below by way of illustration. A waste water treating apparatus of the same construction as the one shown in FIG. 1 was employed in treating waste water. In the apparatus, the first reaction/adjustment tank 1 had a capacity of about 1 cubic meter; the second reaction/adjustment tank 2 had a capacity of about 1 cubic meter; the first spray unit had a capacity of about 0.5 cubic meter; the second spray unit 4 had a capacity of about 0.5 cubic meter; the third tank had a capacity of 0.1 cubic meter; and the fourth tank had a capacity of 0.3 cubic meter. The waste water to be treated, which contained fluorine and surface active agents, prior to treatment, had pH 2.2, a fluorine concentration of 52 ppm, and COD 52 ppm. After treatment, the waste water had pH 7.5, a fluorine concentration of 5.1 ppm, COD 5.2 ppm. Furthermore, the volume of sludge generation could be reduced to less than about 20% of the prior art level.

Also, a waste water treating experiment was conducted employing a waste water treating apparatus of same construction as the one shown in FIG. 2, wherein the sludge fixing tank 36 had a capacity of 0.5 cubic meter and other tanks had same respective capacities as in the aforementioned experimental example. In this case, waste water containing fluorine and surface active agents, prior to treatment, had pH 2.2, a fluorine concentration of 52 ppm, and COD 52 ppm. After treatment, the waste water had pH 7.4, a fluorine concentration of 3.1 ppm. and COD 3.3 ppm. Furthermore, the volume of sludge generation could be reduced to less than 20% of the prior art level. That is, in the experimental example based on the FIG. 2 apparatus, the fluorine concentration and COD levels achieved were both about 2 ppm lower as compared with the experimental example based on the FIG. 1 apparatus.

In both of the foregoing two experimental examples, when the concentration of HF gas contained in the exhaust gas at exhaust gas entry duct 21 leading to the first spray unit 3 was 2 mg/($NM^3$ (normal cubic meter)), the concentration of HF gas at the exhaust gas exit E at the uppermost portion of the second spray unit 4 could be reduced to less than 0.25 mg/($NM^3$). In other words, the HF gas concentration could be reduced to one eighth. The concentration of acetone, a substance representative of organic matter in exhaust gas, was also measured. When the acetone concentration at entry duct 21 leading to the first spray unit 4 was 1 mg/($NM^3$), the acetone concentration at exhaust gas exit E from the second spray unit 4 was less than 0.2 mg/($NM^3$). In other words, the acetone concentration could be reduced to less than one fifth.

As is apparent from the above description, according to the present invention, the quantity of crystalline dehydrated cake formed after removal of the fluorine and organic matter contained in the waste water can be made exceptionally smaller than that in the prior art.

Where, for example, waste water containing fluorine and organic matter (organic solvent) and exhaust gas containing fluorine (hydrogen fluoride) and organic matter (organic solvent), both from a semiconductor plant, are subjects for treatment, the lower portion of the apparatus of the invention is a treating unit for treating the fluorine and organic matter in the waste water, and the upper potion of the apparatus is a common unit which serves for treating the fluorine and organic matter in exhaust gas. In other words, the invention provides a treating apparatus for treating both waste water and exhaust gas, originating from the transistor plant, which are entirely different in physical configuration (i.e., water and air). The apparatus is a rational and economical apparatus for waste water treatment which provides for reduction in solid waste generation.

In comparison with the prior art arrangement, the invention is much advantageous in that whereas a conventional waste water tank was employed only for adjustment of water quantity and water quality, according to the invention, fluorine removal and waste water neutralization are performed through the action of calcium carbonate in a similar tank. This permits size reduction in the waste water treating equipment. Further, sufficient reaction time is allowed in the tank without excess chemical being used. Therefore, good saving can be obtained in running cost, such as chemicals cost, and there is no possible generation of hydroxide that accounted for a larger part of sludge generation in the past. Therefore, the invention provides for decreased sludge generation and apparatus size reduction.

Simultaneously with the removal of fluorine from the waste water, the calcium carbonate mineral and charcoal permit propagation of microorganisms. Therefore, organic substances, such as surface active agents, can be biologically treated without provision of any separate biological treating apparatus which requires addition of nutrients for microorganisms. This results in considerable reduction in solid waste generation.

Organic substances contained in exhaust gases, represented by HF gas, from semiconductor plants, such as fluorine and acetone, which are used in large quantities at such plants, can be also satisfactorily treated.

As compared with the conventional method, the method of the present invention has an advantage that the treating stages involved are more simple with a smaller number of tanks required. Also, components associated with these tanks are smaller in number, which means reduced initial cost. The space above the waste water treating portion is readily available for placement of an exhaust gas treating portion which requires a smaller space than that of the waste water treating portion. This permits easy adaptation for changes in the specifications of production equipment.

Thus, according to the invention, a large space is above the waste water treating portion whose space requirement is generally much larger than that of the exhaust gas treating portion (may be more than ten times in some case) may be readily utilized for exhaust gas treating purposes. This enables an exhaust gas treating portion to be provided on each waste water treating portion in an easy and economical way.

As may be well appreciated from the above description, the present invention, developed in view of today's global needs for environmental preservation, provides a waste water treating apparatus and method which helps achieve resource saving as well as energy saving, is environmentally friendly, and is rational from the standpoint of plant management.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treating method which comprises:
   introducing waste water into a lower portion to cause a calcium carbonate mineral packed in the lower portion to be submerged in the waste water, and agitating the waste water under aeration;

pumping up the waste water from the lower portion and spraying the waste water over an upper portion located above the lower portion which is filled with a calcium carbonate mineral and-a plastic filler;

introducing exhaust gas into a space between the lower portion and the upper portion;

causing the waste water to pass by gravity through the calcium carbonate mineral and plastic filler;

causing the waste water to pass by gravity through the space in which the exhaust gas is present; and returning the waste water to the lower portion under the law of gravity.

2. A waste water treating method which comprises:

introducing waste water into a first lower portion of a first tank to cause a calcium carbonate mineral packed in the first lower portion to be submerged in the waste water, and agitating the waste water under aeration;

pumping up the waste water from the first lower portion and spraying the waste water over a first upper portion located above the first lower portion which is filled with a calcium carbonate mineral and a plastic filler;

introducing exhaust gas into a first space between the first lower portion and the first upper portion;

causing the waste water to pass by gravity through the calcium carbonate mineral and plastic filler in the first upper portion;

causing the waste water to pass by gravity through the first space in which the exhaust gas is present;

returning the waste water to the first lower portion under the law of gravity;

introducing waste water from the first lower portion of the first tank into a second lower portion of a second tank to cause a calcium carbonate mineral packed in the second lower portion to be submerged in the waste water, and agitating the waste water under aeration;

pumping up the waste water from the second lower portion and spraying the waste water over a second upper portion located above the second lower portion which is filled with charcoal and a plastic filler;

introducing exhaust gas from the first space into a second space between the second lower portion and the second upper portion;

causing the waste water to pass by gravity through the second space in which the exhaust gas is present; and returning the waste water to the second lower portion under the law of gravity.

3. A waste water treating method as set forth in claim 2 which further comprises:

introducing waste water from the second tank into a third tank, adding an aluminum agent and a polymer coagulant to the waste water in the third tank, agitating the waste water, and immobilizing sludge to sludge fixing means provided in the third tank;

introducing waste water from the third tank into a fourth tank, subjecting the waste water to solid-liquid separation, and discharging a separated supernatant from the fourth tank;

separating sludge from waste water by precipitation in the fourth tank, introducing the sludge into a fifth tank, and concentrating the sludge through sedimentation in the fifth tank;

returning the sludge separated in the fourth tank to at least one of the first upper portion of the first tank, the second upper portion of the second tank, and the sludge fixing means in the third tank; and dehydrating the sludge concentrated in the fifth tank by dehydrator means.

\* \* \* \* \*